United States Patent [19]

Jung

[11] Patent Number: 5,168,172

[45] Date of Patent: Dec. 1, 1992

[54] CONTROL SYSTEM FOR A WASHING MACHINE

[75] Inventor: Seung T. Jung, Seoul, Rep. of Korea

[73] Assignee: Samsung Electronics Co., Ltd., Kyungki, Rep. of Korea

[21] Appl. No.: 700,245

[22] Filed: May 15, 1991

[30] Foreign Application Priority Data

May 15, 1990 [KR] Rep. of Korea .................. 90-6928

[51] Int. Cl.$^5$ ............................................. H02P 5/00
[52] U.S. Cl. .................................. 307/119; 307/115;
307/116; 307/139; 318/66; 318/268; 388/930
[58] Field of Search ..................... 318/59, 66, 70, 71,
318/268; 388/808, 812, 827, 833, 837, 838, 930,
432, 798, 806; 307/112, 113, 115, 116, 119, 139

[56] References Cited

U.S. PATENT DOCUMENTS

| | | | |
|---|---|---|---|
| 3,851,236 | 11/1974 | Dennhardt et al. | 318/313 |
| 3,962,615 | 6/1976 | Spangler | 318/59 |
| 4,475,070 | 10/1984 | Wilkerson | 318/338 |

Primary Examiner—Jeffrey A. Gaffin
Attorney, Agent, or Firm—Burns, Doane, Swecker & Mathis

[57] ABSTRACT

A control system for a washing machine which controls an induction motor to generate an optimum torque in accordance with a load amount of laundry and whether the washing machine is operating in a washing or drying mode. The control system drives the motor at an optimum torque by varying the input voltage in accordance with the sensed load and sensed mode of operation. This allows a washing machine according to the invention to operate more efficiently and with less noise than conventional washing machines.

6 Claims, 3 Drawing Sheets

CONTROL SYSTEM FOR A WASHING MACHINE

FIELD OF THE INVENTION

The present invention relates in general to a control system for operating a washing machine, and more particularly to a control system for allowing an induction motor to operate at an optimum torque based on the amount of laundry in the washing machine and whether it is operating in the washing mode or the drying or spinning mode.

DESCRIPTION OF THE PRIOR ART

Generally, during drying, a washing machine requires a relatively small torque after the drum reaches a predetermined top speed due to its inertia. On the other hand, during washing a washing machine requires a relatively large torque in order to achieve repetition of the drum's forward and reverse rotation. At times, the generation of a larger torque than necessary for a particular size laundry load occurs. This excessive torque causes noise and reduces efficiency.

Typically, a single-phase induction motor employed in a conventional washing machine was usually designed to accommodate the maximum amount of laundry which could be loaded into the machine so that the drum would have been driven at the maximum speed and the maximum torque with the motor having a rated voltage applied thereto corresponding to the maximum load, as represented by curve A in FIG. 1, independent of the washing mode or drying mode of a washing machine. But, at any time that an amount of laundry was less than a full load, referred to as the partial operation of a washing machine, the motor provided the same maximum torque and the washing machine was operated at an excessive torque. This caused the generation of noise and wasteful consumption of energy. Thus, it was noted that there was a need for varying the torque in accordance with the load amount.

A representative example of a washing machine which controlled its operation in accordance with the load amount is disclosed in Japanese Utility Model Publication No. 64-403980. In this disclosure, the washing machine comprises means for sensing the contact and pressure of clothes received within a drum, means for determining a load amount to be dried in accordance with an output signal from said sensing means, and means for controlling a drying mode operation in accordance with the determined result from said determining means, thereby controlling its operation based on the load amount.

However, the washing machine described in this publication could not be operated at the optimum torque according to a load amount, because its maximum rotation speed was kept independent of a load amount during operation. Therefore, this prior art washing machine did not resolve the problems of generating loud noises and wasting energy.

On the other hand, in order to determine a method for varying the torque in accordance with a load amount, equations representing the relationship between the speed and the torque of an induction motor can be obtained as follows:

$$N = No(1-S) \text{ (rpm)} \quad (1)$$

$$N = \frac{120f}{P}(1 - S) \text{ (rpm)} \quad (2)$$

Wherein, N is the speed of the induction motor, No is a synchronous speed, f is a frequency of a power source, P is a number of poles, and S is slip.

If an induction motor is expressed by an equivalent circuit, the torque T of the induction motor can be expressed as follows:

$$T = \frac{SV_2^2 R_2}{Wo(R_2^2 + S^2 X_2^2)} \quad (3)$$

Wherein, Wo is a synchronous angular velocity, $V_2$ is a secondary voltage, $R_2$ is a secondary resistor, $X_2$ is a leakage reactance, and S is the slip.

At the time that the induction motor of a washing machine is actuated, motor slip occurs. As the load of the motor increases so does the frequency of slips, the number of rotations Equation (2) decreases, while the torque in Equation (3) increases. Furthermore, the fluctuation of loads regarding the induction motor of a washing machine does not greatly affect the slip of the motor due to the inertia of a load.

When used to wash only a partial load, a washing machine could operate at the optimum torque by varying the voltage in equation (3). Thus, during the washing mode of a washing machine, as the relative value of the input voltage to an induction motor varies from 65% to 100%, the number of rotations changes from 94% to 100%, and the motor torque fluctuates from 55% to 100%. However, during the drying mode, a relative input voltage of 65% allows the number of rotations to be only 94% of maximum. This results in a normal drying effect and enables low noise operation, the noise being reduced from 53.5 dB to 48.5 dB. Further, this power control results in decreased energy consumption.

Accordingly, it is noted that a method of varying the torque in accordance with an amount of loads as mentioned above can induce a single-phase induction motor to be operated at an optimum speed and torque. These optimal values are illustrated by induction motor curves B and C in FIG. 1, in the washing mode or the drying mode of a washing machine, respectively. For this reason, the noise can be reduced and the efficiency can be increased in a washing machine.

SUMMARY OF THE INVENTION

Accordingly, it is an object of the present invention to provide a control system for operating the induction motor of a washing machine at an optimum torque, by varying an input voltage to the induction motor in accordance with a load amount.

It is another object of the present invention to provide a control system for varying the voltage to be applied to a washing machine, automatically or manually, in accordance with a load amount.

In accordance with the present invention, these and other objects can be accomplished by providing a control system for a washing machine, wherein the control system comprises a receiving means adapted for receiving laundry; sensing means disposed in said receiving means for sensing the weight of laundry; A/D converting means adapted for receiving an output signal from said sensing means and converting it into a digital signal; first switching means including a plurality of manual selecting switches each adapted for outputting a predetermined signal in accordance with the selection of a user, and a movable toggle switch including at one stage a plurality of terminals connected correspondingly to said plurality of manual selecting switches and at the other stage a plurality of terminals connected selectively to said A/D converting means, said movable toggle switch transferring signals from said plurality of terminals at one stage and at the other stage selectively to said control means; control means adapted for receiving an output signal from said first switching means and outputting a predetermined signal in accordance with an internal program; amplifying means including a plurality of amplifiers adapted individually for amplifying an output signal from said control means; second switching means including a plurality of switches connected correspondingly to said plurality of amplifiers for being driven by the amplified signals from said plurality of amplifiers; and voltage transforming means including a primary winding connected to a power source and a secondary winding connected to a plurality of taps, said plurality of taps being individually connected to the corresponding switches in said second switching means, said voltage transforming means outputting a predetermined voltage as said plurality of taps are selected.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF PREFERRED EMBODIMENTS

Figure 1:
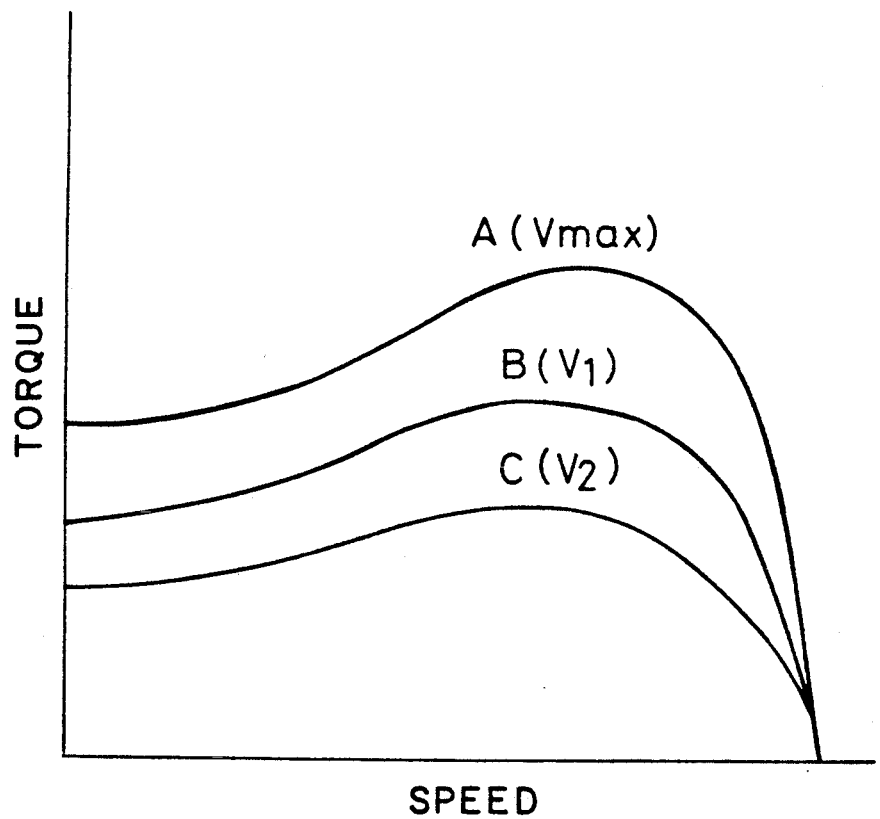
FIG. 1 shows torque characteristics of a single phase-induction motor employed in the present invention.
Figure 2:
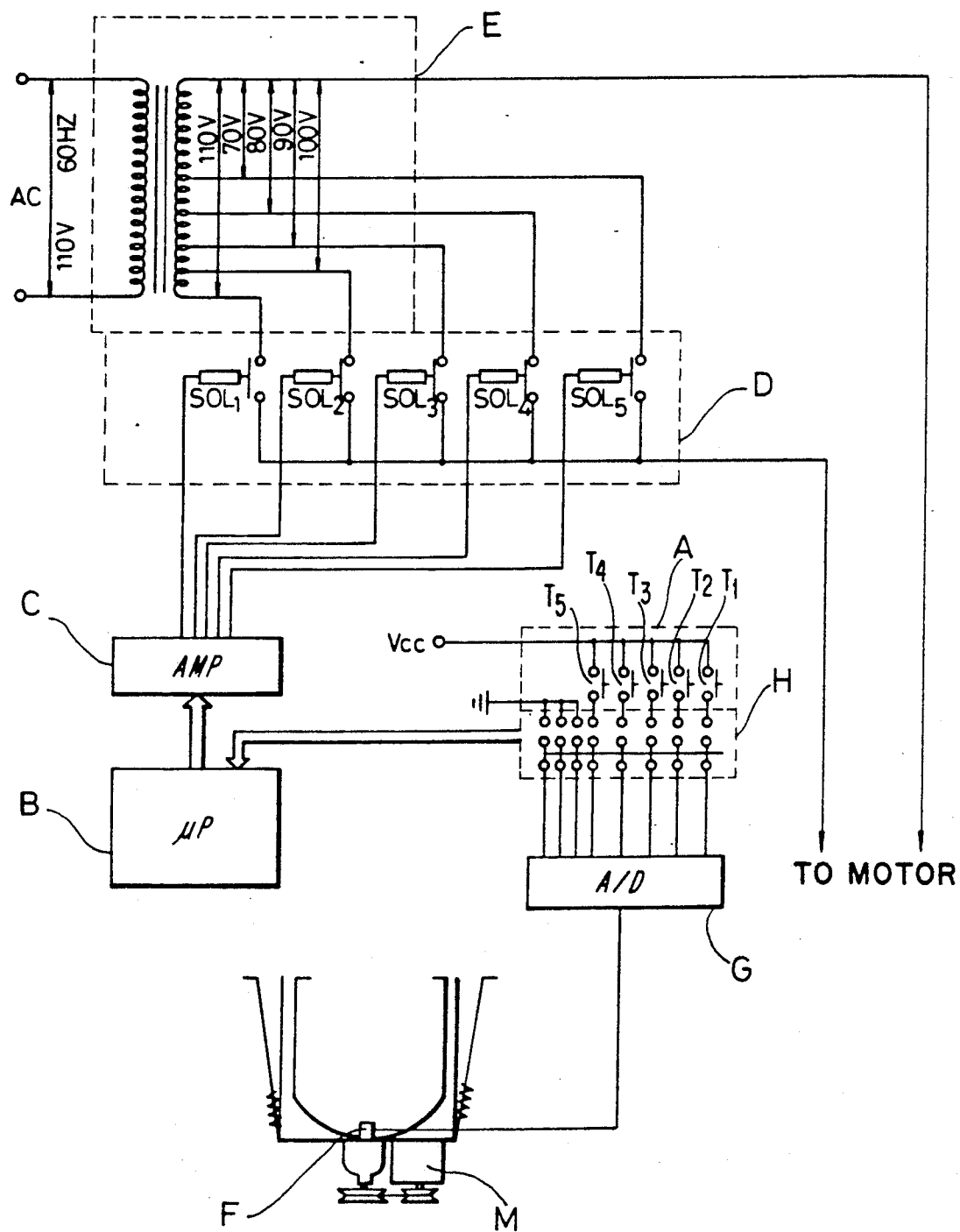
FIG. 2 is a schematic circuit block diagram of a control system for a washing machine in accordance with the present invention.

Referring now to FIG. 2, a control system for a washing machine in accordance with the present invention comprises a transformer E having its primary winding connected to an AC 110 V, 60 Hz commercial power source via a plug and its secondary winding connected to taps according to the number of its turns, and a solenoid switching circuit D including a plurality of solenoids SOL1 to SOL5 each including a switch terminal connected to a tap and another switch terminal connected to one terminal of a single phase induction motor M. Each tap is adapted to output either 70 V, 80 V, 90 V, 100 V and 110 V in accordance with a ratio of the number of turns of the associated secondary winding to the number of turns of the primary winding. The 70 V tap is connected to a switch terminal of the fifth solenoid SOL5 in the solenoid switching circuit D, the 80 V tap is connected to a switch terminal of the fourth solenoid SOL4, the 90 V tap to a switch terminal of the third solenoid SOL3, the 100 V tap to a switch terminal of the second solenoid SOL2, and the 110 V tap to a switch terminal of the first solenoid SOL1 The single phase motor M includes another terminal connected to the other terminal of the secondary winding.

Also, the control system for the washing machine in accordance with the present invention comprises an amplifying circuit C including a plurality of terminals each connected to terminals of the solenoid driving coils for driving the solenoids SOL1 to SOL5. The other terminals (not shown) of the solenoid driving coils are connected to a ground. The amplifying circuit C applies voltage to each solenoid driving coil at the corresponding terminal to drive the corresponding solenoid to be switched-on. The amplifying circuit C includes five amplifiers.

Also, the control system for the washing machine in accordance with the present invention comprises a microprocessor B including a plurality of input ports PB0 to PB7 and a plurality of output ports PA0 to PA4 each connected to one of the five amplifiers in the amplifying circuit C. If a high signal is output from the output port PA0 while low signals are output from the remaining output ports PA1 to PA4, then the high signal from the output port PA0 is amplified by the corresponding amplifier in the amplifying circuit C to drive the first solenoid SOL1. If a high signal is output from the output port PA1 while low signals are output from the remaining output ports PA0 and PA2 to PA4, then the high signal from the output port PA1 is amplified by the corresponding amplifier in the amplifying circuit C to drive the second solenoid SOL2. Similarly, if a high signal is output from the output port PA2 while low signals are output from the remaining output ports PA0, PA1, PA3 and PA4, then the high signal from the output port PA2 is amplified by the corresponding amplifier in the amplifying circuit C to drive the third solenoid SOL3. Also, if a high signal is output from the output port PA3 while low signals are output from the remaining output ports PA0, PA1, PA2 and PA4, then the high signal from the output port PA3 is amplified by the corresponding amplifier in the amplifying circuit C to drive the fourth solenoid SOL4. Finally, if a high signal is output from the output port PA4 while low signals are output from the remaining output ports PA0 to PA3, then the high signal from the output port PA4 is amplified by the corresponding amplifier in the amplifying circuit C to drive the fifth solenoid SOL5.

Also, the control system for the washing machine in accordance with the present invention comprises a manual select switching circuit A including five load voltage selecting switches T1 to T5 each having one terminal connected to a Vcc terminal and the other terminal, a toggle switch H having one stage connected to the other terminals of the load voltage selecting switches T1 to T5 in the manual select switching circuit A and ground and the other stage, an A/D converter G having one stage connected to the other stage of the toggle switch H and the other stage and a weight sensor F in a washing bath connected to the other stage of the A/D converter G. The switches T1 to T5 are connected to the input ports PB0 to PB4 of the microprocessor B via the toggle switch H in accordance with the load capacity of the laundry and the matched voltage. Namely, the load voltage selecting switch T1 which is selected under the condition of the maximum load is connected to the input port PB0 of the microprocessor B. The load voltage selecting switch T2 is connected to the input port PB1 of the microprocessor B. The load voltage selecting switch T3 is connected to the input port PB2 of the microprocessor B. Similarly, the load voltage selecting switch T4 is connected to the input port PB3 of the microprocessor B. Also, the load voltage selecting switch T5 is connected to the input port PB4 of the microprocessor B. On the other hand, the input ports PB5 to PB7 are connected to ground.

The toggle switch H connects the load voltage selecting switches T1 to T5 and the A/D converter G selectively to the input ports PB0 to PB4 of the microprocessor B. The A/D converter G is connected to the weight sensor F disposed in the washing bath to transfer the sensed weight value from the weight sensor F to the microprocessor B via the toggle switch H.

Now, the operation of the control system for the washing machine in accordance with the present invention as above-stated will be described in detail.

First, upon powering the washing machine, AC 110 V commercial power is applied to the primary winding of the transformer E. A user puts the laundry into the washing bath, operates the toggle switch H in accordance with the load capacity of the laundry to connect the manual select switching circuit A to the input ports PB0 to PB4 of the microprocessor B, and thereafter selects, for example, the switch T4 in the manual select switching circuit A. Then, a high level signal is applied to the input port PB3 connected to the switch T4, while low level signals are applied to the remaining input ports PB0, PB1, PB2 and PB4. The microprocessor B processes such signals as follows.

The microprocessor B determines whether the selected signal from the manual select switching circuit A is the previously selected signal. If the selected signal from the manual select switching circuit A is the signal to the existing port, the previously selected signal is maintained naturally. If the selected signal from the manual select switching circuit A is not the signal to the existing port, the microprocessor B clears the signal to the existing port, and outputs a high level signal at the output port PA3 and low level signals at the remaining output ports PA0 to PA2 and PA4 to turn off the selected solenoid. The high level signal from the output port PA3 is amplified by the corresponding amplifier in the amplifying circuit C to drive the corresponding solenoid. Namely, the high level signal from the output port PA3 is amplified by the corresponding amplifier in the amplifying circuit C t excite the corresponding solenoid SOL4 in the solenoid switching circuit D. The excited solenoid SOL4 turns on, thereby enabling voltage (80 V) induced in the associated tap of the secondary winding to be applied to the induction motor M.

On the other hand, if the user operates the toggle switch H to connect the A/D converter G to the input ports PB0 to PB4 of the microprocessor B, the A/D converter G is applied with a signal in accordance with the sensed load capacity from the weight sensor F disposed in the washing bath. The A/D converter G converts the signal into a digital signal and applies the digital signal to the input ports PB0 to PB4 of the microprocessor B.

The microprocessor B processes the digital signal to output a high level signal at one of its output ports and low level signals at the remaining output ports. As mentioned above, the high level signal from the one output port is amplified by the corresponding amplifier in the amplifying circuit C to drive the corresponding solenoid. Therefore, the voltage matched to the load capacity can be applied to the induction motor M.

Each tap is adapted to output 70 V, 80 V, 90 V, 100 V and 110 V in accordance with the ratio of the number of turns of the associated secondary winding to the number of turns of the primary winding. Therefore, the voltage induced in the 80 V tap of the secondary winding is applied from the transformer E to the induction motor M via the solenoid switching circuit D, thereby allowing the induction motor M to generate the driving torque in accordance with the 80 V input voltage.

Then, if the load capacity of the laundry is less or more than the existing load capacity, the processes as mentioned above are accomplished repeatedly, the solenoid previously selected turns off and the load voltage selecting switches T1 to T5 in the manual select switching circuit A and the solenoid (for example, SOL2) corresponding to the load capacity sensed by the weight sensor F are selected, so that voltage induced in the associated tap of the secondary winding of the transformer E can be applied to the induction motor M, thereby enabling the induction motor M to generate the torque matched to the load capacity of the laundry.

Figure 3:
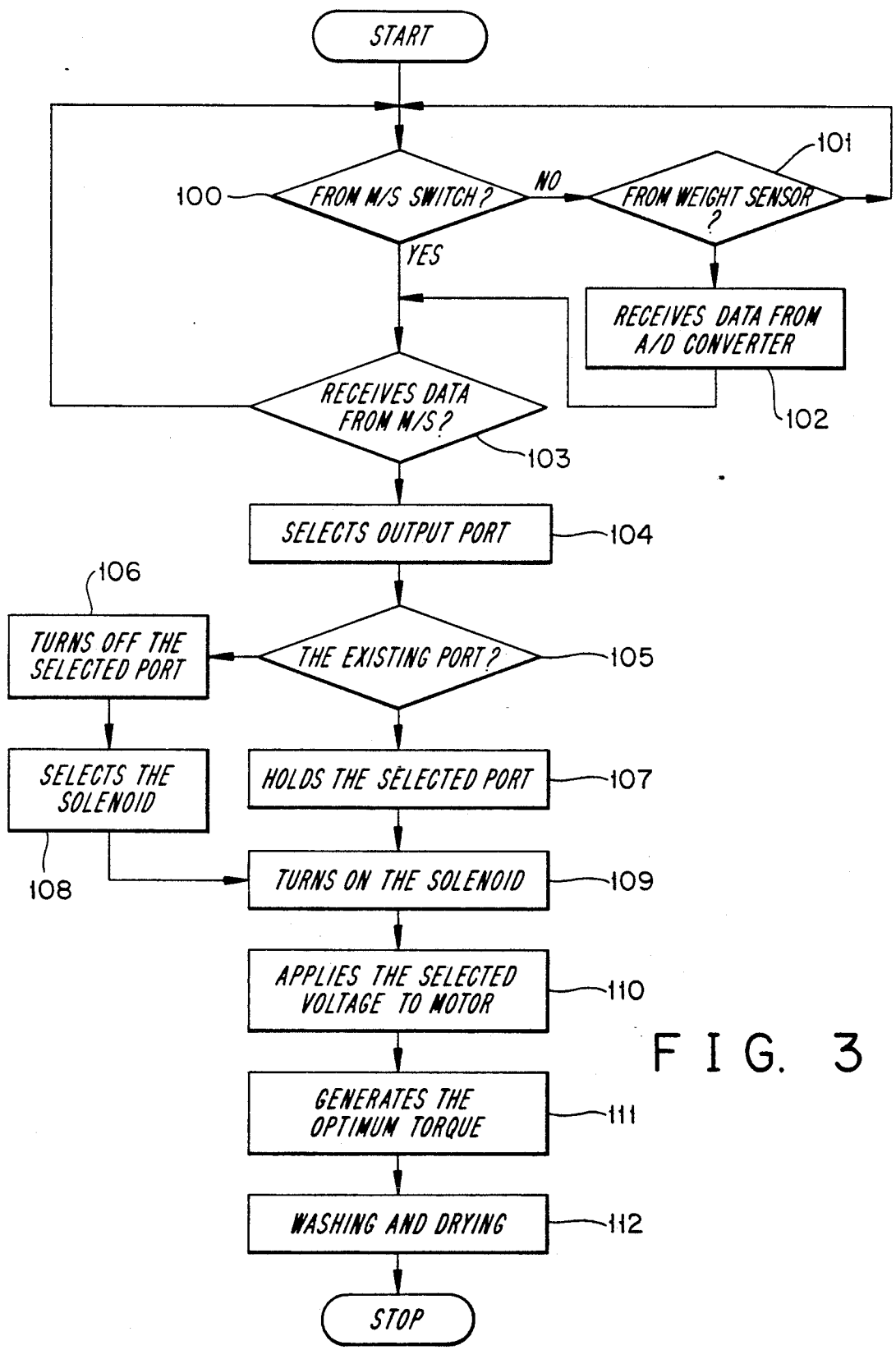
FIG. 3 is a flowchart illustrating the operation of the control system for the washing machine in accordance with the present invention.

Now, the operation of the control system for the washing machine in accordance with the present invention as above-stated will be described with reference to a flowchart illustrated in FIG. 3.

Upon powering the washing machine, the user operates the toggle switch H in order to select a voltage in accordance with the load by means of the manual select switching circuit A or the weight sensor F. Next, upon scanning the input port, it is determined at the inquiry step 100 whether the input signal to the input port is the signal from the manual select switching circuit A. If the answer is yes, the process simply proceeds to the next inquiry step 103 which receives the signal from the manual select switching circuit A. If the answer is no, the process proceeds to the inquiry step 101 which, upon scanning the input port, determines whether the input signal is the signal sensed by the weight sensor F. If the input signal is the signal sensed by the weight sensor F, the process moves to the step 102 which receives the output signal from the A/D converter. However, if the input signal is not the signal sensed by the weight sensor F, the process returns to the step 100.

Thereafter, the process moves to the step 104 which processes the signal received through the input port to select the output port signal capable of driving the solenoid matched to the load. Then, the process moves to the next inquiry step 105 which determines whether the output port signal is the existing port signal. If the output port signal is not the existing port signal, the process proceeds to the step 106 in which the existing port signal is changed, and then proceeds to the next step 108 which selects a new port signal. Thereafter, the process moves to the step 109.

On the other hand, at the inquiry step 105, if the answer is yes, the process proceeds to the step 107 in which the existing port signal can be maintained naturally, then moves to the next step 109 in order to output the corresponding port signal to the output port. Thereafter, the amplifier in the amplifying circuit C corresponding to the output signal operates in order to output 24 V to excite the corresponding solenoid in the solenoid switching circuit D. Therefore, the exited solenoid turns on, thereby enabling the voltage matched to the load, induced in the associated tap of the secondary winding of the transformer E to be applied to the induction motor M. Thus, the induction motor M can generate the optimum torque (steps 110 and 111). Then, the induction motor is actuated at the optimum torque, thereby causing the washing machine to efficiently carry out its washing mode and drying mode operations.

As hereinbefore described, the present invention can provide the control system for the washing machine which is capable of driving the induction motor at the optimum torque by varying the input voltage to the motor in accordance with the load capacity. Therefore, the washing machine in accordance with the present invention can solve the prior problems of the loud noise and the unnecessary consumption of the electric energy therein because of the maximum speed generated by the motor regardless of the load capacity.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A control system for a washing machine comprising:
   receiving means for receiving laundry;
   sensing means disposed in said receiving means for sensing a weight of said laundry;
   A/D converting means for receiving an output signal from said sensing means and converting said output signal into a digital signal;
   first switching means selectively connectable to said A/D converting means;
   control means for receiving an output signal from said first switching means and outputting a predetermined signal in accordance with an internal program;
   amplifying means including a plurality of amplifiers adapted individually for amplifying an output signal from said control means;
   second switching means including a plurality of switches connected correspondingly to said plurality of amplifiers for being driven by the amplified signals from said plurality of amplifiers; and
   voltage transforming means including a primary winding connected to a power source and a secondary winding having a plurality of taps, said plurality of taps being individually connected to the corresponding switches in said second switching means, and said voltage transforming means outputting a predetermined voltage as said plurality of taps are selected.

2. A control system for a washing machine as set forth in claim 1, wherein said first switching means comprises:
   a plurality of manual selecting switches each adapted for outputting a selection signal in accordance with the selection of a user and a movable toggle switch including a first plurality of terminals connected correspondingly to said plurality of manual selecting switches and a second plurality of terminals connected selectively to said A/D converting means, said movable toggle switch selectively transferring signals from either said first or second plurality of terminals to said control means.

3. A control system for a washing machine comprising:
   receiving means for receiving laundry;
   sensing means for sensing a weight of said laundry;
   first switching means for switching between a manual load setting and an output load signal of said sensing means;
   control means for receiving an output signal from said first switching means and outputting a predetermined signal in response thereto;
   voltage transforming means for supplying a different voltage level to each of a plurality of voltage taps; and
   second switching means for selecting one of said plurality of voltage taps based on said predetermined signal.

4. The control system of claim 3, further comprising A/D converting means for digitizing the output load signal of said sensing means.

5. The control system of claim 3, wherein said first switching means further comprises:
   a plurality of manual switches for selecting said manual load setting; and
   a switch for selecting as an output either said manual load setting or said output load signal.

6. The control system of claim 3, wherein said voltage transforming means further comprises a first and second winding.

* * * * *